United States Patent
Sarginson et al.

(10) Patent No.: US 11,932,824 B2
(45) Date of Patent: Mar. 19, 2024

(54) CORROSION INHIBITION

(71) Applicant: EQUUS UK TOPCO LTD, Goole (GB)

(72) Inventors: Helen Rachel Sarginson, Goole (GB); Makaye Tabibi, Plainsboro, NJ (US)

(73) Assignee: EQUUS UK TOPCO LTD, Goole (GB)

( * ) Notice: Subject to any disclaimer, the term of this patent is extended or adjusted under 35 U.S.C. 154(b) by 0 days.

(21) Appl. No.: 17/763,917

(22) PCT Filed: Sep. 30, 2020

(86) PCT No.: PCT/US2020/053439
§ 371 (c)(1),
(2) Date: Mar. 25, 2022

(87) PCT Pub. No.: WO2021/071709
PCT Pub. Date: Apr. 15, 2021

(65) Prior Publication Data
US 2022/0333033 A1  Oct. 20, 2022

Related U.S. Application Data

(60) Provisional application No. 62/911,590, filed on Oct. 7, 2019.

(51) Int. Cl.
*C10M 145/02* (2006.01)
*C08F 10/10* (2006.01)
(Continued)

(52) U.S. Cl.
CPC ........... *C10M 145/02* (2013.01); *C08F 10/10* (2013.01); *C09K 15/06* (2013.01);
(Continued)

(58) Field of Classification Search
CPC ............ C10M 145/02; C10M 169/041; C10M 2203/003; C10M 2209/02; C10M 129/74;
(Continued)

(56) References Cited

U.S. PATENT DOCUMENTS 3,381,022 A * 4/1968 William .................. C08F 8/44
508/494
3,382,056 A   5/1968 Mehmedbasich
(Continued)

FOREIGN PATENT DOCUMENTS

WO   2016053634 A1   4/2016
WO   2017117346 A1   7/2017

OTHER PUBLICATIONS

International Search Report and Written Opinion for International Application No. PCT/US2020/053439, dated Dec. 16, 2020, 8 pages.

*Primary Examiner* — Ellen M McAvoy

(57) ABSTRACT

The present invention relates to a method of inhibiting corrosion experienced during use of a base oil or lubricant by the addition of a polyester corrosion inhibitor. More especially, the polyester corrosion inhibitor is the reaction product of an alk(en)yl substituted succinic anhydride wherein the average number of succinic groups per alk(en)yl group is less than 3.0, and at least one polyol. There is also provided a composition comprising such a polyester corrosion inhibitor and use of such a composition as a corrosion inhibitor, as well as a base oil or lubricant comprising such a polyester corrosion inhibitor.

18 Claims, 6 Drawing Sheets

Figure 6:
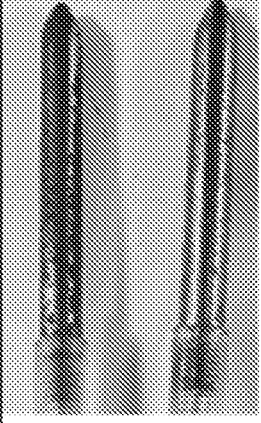
Figure 6:
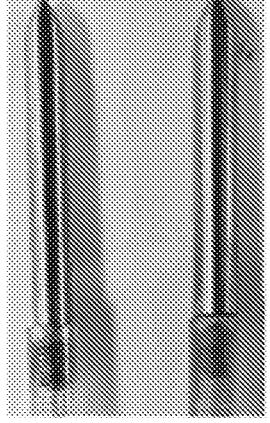
Figure 6:
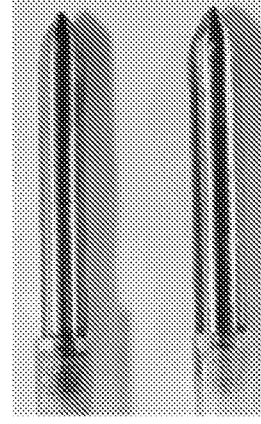

| Corrosion inhibitor | None | Imidazoline based | C3 polyol polyester | C5 polyol polyester | C6 polyol polyester |
|---|---|---|---|---|---|
| Group I base oil Appearance of steel rod | | | | | |
| Corrosion result | Severe | Light | Moderate | Light | Light |
| Result ranking | 5 | 1 | 4 | 2 | 3 |

(51) Int. Cl.
  *C09K 15/06* (2006.01)
  *C10M 169/04* (2006.01)
  *C10N 20/04* (2006.01)
  *C10N 30/12* (2006.01)
(52) U.S. Cl.
  CPC ..... *C10M 169/041* (2013.01); *C08F 2810/00* (2013.01); *C10M 2203/003* (2013.01); *C10M 2209/02* (2013.01); *C10N 2020/04* (2013.01); *C10N 2030/12* (2013.01)
(58) Field of Classification Search
  CPC ....... C10M 2207/127; C10M 2209/102; C08F 10/10; C08F 2810/00; C09K 15/06; C10N 2020/04; C10N 2030/12
  USPC .......................... 508/485, 492, 455; 252/396
  See application file for complete search history.

(56) References Cited

U.S. PATENT DOCUMENTS

| | | | | |
|---|---|---|---|---|
| 4,209,411 A | * | 6/1980 | Winans | C10L 10/08 |
| | | | | 549/423 |
| 4,448,586 A | * | 5/1984 | Weidig | C10L 1/18 |
| | | | | 252/396 |
| 4,814,010 A | | 3/1989 | Tury | |
| 4,814,080 A | | 3/1989 | Tury | |
| 4,839,068 A | * | 6/1989 | Lange | C10M 133/16 |
| | | | | 508/494 |
| 4,954,572 A | * | 9/1990 | Emert | C10M 133/04 |
| | | | | 508/304 |
| 5,137,980 A | * | 8/1992 | DeGonia | C10L 1/221 |
| | | | | 525/327.7 |
| 5,273,672 A | * | 12/1993 | Dasai | C10M 129/00 |
| | | | | 252/79 |
| 5,292,480 A | | 3/1994 | Fischer et al. | |
| 5,723,417 A | * | 3/1998 | Kitahara | C10M 145/22 |
| | | | | 508/496 |
| 5,736,492 A | * | 4/1998 | Clark | C07C 57/13 |
| | | | | 508/486 |
| 10,125,306 B2 | * | 11/2018 | Wang | C10L 1/1983 |
| 2005/0209112 A1 | * | 9/2005 | Clason | C10M 141/10 |
| | | | | 508/486 |
| 2006/0135375 A1 | * | 6/2006 | Buitrago | C10M 141/10 |
| | | | | 508/192 |
| 2011/0160405 A1 | | 6/2011 | Subramaniyam | |
| 2014/0274847 A1 | | 9/2014 | Regensburger et al. | |
| 2022/0168795 A1 | * | 6/2022 | Matsumoto | B21D 26/041 |

* cited by examiner

Figure 1

| Corrosion inhibitor | None | Imidazoline based | C3 polyol polyester | C5 polyol polyester | C6 polyol polyester |
|---|---|---|---|---|---|
| Group I base oil<br><br>Appearance of steel rod | | | | | |
| Corrosion result | Severe | Light | Moderate | Light | Light |
| Result ranking | 5 | 1 | 4 | 2 | 3 |

Figure 2

| Corrosion inhibitor | None | Imidazoline based | C3 polyol polyester | C5 polyol polyester | C6 polyol polyester |
|---|---|---|---|---|---|
| Group II base oil Appearance of steel rod | | | | | |
| Corrosion result | Severe | Light | Moderate | Light | Light |
| Result ranking | 5 | 1 | 4 | 2 | 3 |

Figure 3

| Corrosion inhibitor | None | Imidazoline based | C3 polyol polyester | C5 polyol polyester | C6 polyol polyester |
|---|---|---|---|---|---|
| Group III base oil<br><br>Appearance of steel rod | | | | | |
| Corrosion result | Severe | Light | Moderate | Moderate | Light |
| Result ranking | 5 | 1 | 4 | 3 | 2 |

Figure 4

| Corrosion inhibitor | None | Imidazoline based | C3 polyol polyester | C5 polyol polyester | C6 polyol polyester |
|---|---|---|---|---|---|
| Group IV base oil<br><br>Appearance of steel rod | | | | | |
| Corrosion result | Severe | Light | Moderate | Moderate | Light |
| Result ranking | 5 | 1 | 4 | 3 | 2 |

Figure 5

| Corrosion inhibitor | None | Imidazoline based 0.05% | C5 polyol polyester 0.05% | C6 polyol polyester 0.05% | C5 polyol polyester 0.1% | C6 polyol polyester 0.1% |
|---|---|---|---|---|---|---|
| Priolube 1973/3987 blend Appearance of steel rod | | | | | | |
| Corrosion result | Severe | Moderate | Moderate | Light | Light | Light |
| Result ranking | 6 | 5 | 4 | 3 | 2 | 1 |

| Corrosion inhibitor | None | Crodasinic O | C6 polyol polyester |
|---|---|---|---|
| Priolube 1973<br><br>Appearance of duplicate steel rods |  |  |  |
| Corrosion result | Fail – severe rusting | Pass – no rusting | Pass – no rusting |

CORROSION INHIBITION

CROSS-REFERENCE TO RELATED APPLICATION

This application is the U.S. National Phase of PCT/US2020/053439, filed Sep. 30, 2020, which claims priority to U.S. Provisional Application No. 62/911,590, filed Oct. 7, 2019, and the contents of each of which are incorporated herein by reference in their entireties for all purposes.

FIELD OF INVENTION

The present invention relates to a method of inhibiting corrosion in a base oil or lubricant by the addition of a polyester corrosion inhibitor.

BACKGROUND

Lubricants used in automotive, industrial, marine and metal working applications typically include a Group I-V base oil (commonly referred to as "base oil") and one or more additives that impart or enhance certain properties of the lubricant (e.g. deliver reduced friction and wear, increased viscosity, improved viscosity index, and resistance to corrosion, oxidation, aging or contamination). Group I-III base oils are paraffinic and refined from petroleum crude oil, Group IV base oils are full synthetic (polyalphaolefin) oils and Group V base oils are classified as the other base oils that do not fall into the prior categories, including esters, naphthenic, silicone, phosphate ester and polyalkylene glycol (PAG).

Corrosion inhibitors are generally used in many types of lubricants (such as with any Group I-V base oil, in hydraulic fluids, and greases) as desirable additives because they decrease the rate at which materials (typically metal) in contact with the lubricant corrode due to chemical reaction between the lubricant and the material with its environment.

Typical corrosion inhibitors used in these lubricant applications are sulphonate derivatives, azole derivatives (e.g. imidazoline, thiadiazole, benzatriazole), amines, sarcosines and dibasic acid salts (e.g. dodecanedioic acid amine salt).

Use of corrosion inhibitors are documented in the prior art.

US patent application 20140274847 relates to achieving corrosion inhibition in base oils using the reaction product of alkenylsuccinic anhydride and a polyalkylene glycol oil.

U.S. Pat. No. 5,292,480 relates to a corrosion inhibitor formed from an acid-anhydride ester made from C18 unsaturated fatty acids with maleic anhydride post reacted with a polyalcohol.

PCT patent publication WO 2017/117346 describes the use of a reaction product of polydentate acids, polyalkylene glycols, and anhydrides (e.g., alkyl and/or alkenyl succinic anhydrides) as a corrosion inhibitor for use in metal working fluids.

US patent application publication 2011/0160405 describes the use of a polymeric phosphate ester of polyisobutylene succinate ester as a naphthenic acid corrosion inhibitor in an unrefined crude oil, feedstock or hydrocarbon stream.

U.S. Pat. No. 3,382,056 describes the use of low molecular weight copolymers of maleic anhydride with aliphatic olefins as rust inhibitors in refined fuel compositions.

SUMMARY OF THE INVENTION

Accordingly, the present invention provides a method of inhibiting corrosion by adding to a base oil or lubricant an effective amount of a polyester corrosion inhibitor obtainable by reacting an alk(en)yl substituted succinic anhydride wherein the average number of succinic groups per alk(en)yl group is less than 3.0, with at least one polyol.

The invention further provides a composition comprising a polyester corrosion inhibitor which is the reaction product of an alk(en)yl substituted succinic anhydride wherein the average number of succinic groups per alk(en)yl group is less than 3.0, and at least one polyol. Suitably, such a composition can be understood to be a corrosion inhibitor composition.

The present invention also provides a base oil or lubricant composition comprising between 0.01 wt % and 1.0 wt % polyester corrosion inhibitor based on the total weight of the base oil or lubricant.

The invention also provides the use of a polyester obtainable by reacting an alk(en)yl substituted succinic anhydride wherein the average number of succinic groups per alk(en)yl group is less than 3.0, with at least one polyol, as a corrosion inhibitor.

DETAILED DESCRIPTION OF THE INVENTION

The present invention relates to a composition, method and use concerning a polyester corrosion inhibitor. The polyester corrosion inhibitor is obtainable by reacting (is the reaction product of) an alk(en)yl substituted succinic anhydride wherein the average number of succinic groups per alk(en)yl group is less than 3.0 with at least one polyol.

More especially, in the method of inhibiting corrosion by adding to a base oil or lubricant an effective amount of a polyester corrosion inhibitor obtainable by reacting an alk(en)yl substituted succinic anhydride wherein the average number of succinic groups per alk(en)yl group is less than 3.0, with at least one polyol, the effective amount may be between 0.01 wt % and 1.0 wt % polyester corrosion inhibitor based on the total weight of the base oil or lubricant. Preferably the method comprising adding to the base oil or lubricant between 0.02 wt % and 0.7 wt % polyester corrosion inhibitor, more preferably between 0.03 wt % and 0.5 wt %, and most preferably between 0.05 wt % and 0.3 wt %, or even 0.05 wt % and 0.1 wt %. Features of the polyester corrosion inhibitor will now be described in more detail.

As stated above, suitably said alk(en)yl substituted succinic anhydride has an average number of succinic groups per alk(en)yl group of less than 3.0, preferably less than 2.5 and more preferably less than 2.0.

The alk(en)yl group of the alk(en)yl substituted succinic anhydride used herein is preferably an alkenyl group. The alk(en)yl, preferably alkenyl, group is suitably a polyolefin obtained by polymerizing a monoolefin, preferably containing in the range from 2 to 6, more preferably 3 to 4 carbon atoms. Suitable monoolefins include ethylene, propylene, butylene, isobutylene and mixtures thereof. Isobutylene is particularly preferred. Suitably the isobutylene used in the present invention may be obtained either through the petrochemical route or the fermentation route as known to the person skilled in the art; thus, polyisobutylene (PIB) is a particularly preferred alk(en)yl group and polyisobutylene succinic anhydride (PIBSA) is a particularly preferred alk(en)yl substituted succinic anhydride.

In one embodiment, the alk(en)yl group is a C6 to C20, preferably C8 to C18 alkene. Specific examples include octene, dodecene and octadecene, which may be linear or branched. Suitable alk(en)yl substituted succinic anhydrides are octene succinic anhydride (OSA), branched dodecene succinic anhydride (DDSA), and octadecene succinic anhydride (OSA).

The alk(en)yl group is suitably reacted with maleic anhydride, maleic acid, or mono- or di-C1 to C6 alkyl or alkenyl maleates, e.g. dibutyl maleate, preferably with maleic anhydride, to form the alk(en)yl substituted succinates using methods well known in the art.

The alk(en)yl group, preferably PIB, suitably has an average molecular weight, preferably Mn (measured as described herein), in the range from 100 to 15,000, preferably 500 to 3,000, more preferably 750 to 1,500, particularly 850 to 1,100, and especially 900 to 1,000.

The alk(en)yl group suitably comprises in the range from 5 to 180, preferably 10 to 55, more preferably 13 to 30, particularly 15 to 20, and especially 16 to 18 monomer units, preferably monoolefin units, and particularly isobutylene units.

There are at least 2 different grades of commercially available PIB, conventional PIB and highly reactive PIB. Highly reactive PIB has a high vinylidene content characterised by a high concentration of terminal double bonds, suitably greater than 70%, and preferably greater than 80% and up to 100% by weight. Highly reactive PIB is preferably utilized in the polyester corrosion inhibitor described herein.

The average number of succinic groups per alk(en)yl group, preferably PIB, is less than 3.0 in the alk(en)yl substituted succinic anhydride used herein. The average number of succinic groups per alk(en)yl group, preferably PIB, is suitably in the range from 0.3 to 2.5, and preferably in the range from 1.0-1.6.

The alk(en)yl substituted succinic anhydride is obtainable by reacting maleic anhydride, maleic acid, or mono- or di-C1 to C6 alkyl or alkenyl maleates, e.g. dibutyl maleate, preferably maleic anhydride, with monoolefin, preferably PIB, at a molar ratio of suitably between 0.3 to 2.5:1 and preferably between 1.0 to 1.6:1.

The polyol starting material used herein to the form the polyester corrosion inhibitor preferably comprises in the range from 2 to 20, preferably 3 to 10, more preferably 4 to 8, and particularly 6 hydroxyl groups. Suitable polyols include ethylene glycol, propylene glycol, glycerol and polyglycerol (e.g. containing up to 6, preferably up to 3 glycerol units), C4 polyols such as threitol and erythritol, C5 polyols such as inositol, arabitol, ribitol, xylitol and pentaerythritol, C6 polyols such as galactitol, fucitol, iditol, trimethylolpropane, mannitol, sorbitol and derived materials such as sorbitan, and C12 polyols such as sucrose. The C4 to C6 polyols may be the reduced or hydrogenated forms of the corresponding tetrose, pentose and hexose sugars.

Preferably the polyol is selected from the group consisting of glycerol, polyglycerol, pentaerythritol, trimethylolpropane, mannitol, sorbitol, sorbitan, sucrose and mixtures thereof, more preferably selected from the group consisting of pentaerythritol, mannitol, sorbitol, sorbitan and mixtures thereof, particularly selected from the group consisting of mannitol, sorbitol, sorbitan and mixtures thereof, and especially selected from the group consisting of sorbitol, sorbitan and mixtures thereof. In one particularly preferred embodiment the polyol comprises, consists essentially of, or consists of sorbitol.

The molar ratio of alk(en)yl substituted succinic anhydride, preferably PIBSA, reacted with polyol, preferably sorbitol, to form the polyester corrosion inhibitor is suitably in the range from 0.5 to 10:1, preferably 0.8 to 6:1, more preferably 1.1 to 4:1 and particularly 1 to 3:1.

The polyester corrosion inhibitor suitably has a number average molecular weight (Mn) (measured as described herein) in the range from 1,500 to 500,000, preferably 2,000 to 50,000, more preferably 2,500 to 15,000, particularly 3,000 to 10,000, and especially 3,500 to 5,000.

The polyester corrosion inhibitor suitably has a weight average molecular weight (Mw) (measured as described herein) in the range from 3,000 to 1,000,000, preferably 5,000 to 100,000, more preferably 7,000 to 40,000, particularly 8,000 to 20,000, and especially 9,000 to 12,000.

The polyester corrosion inhibitor suitably comprises on average at least 3 ester groups, preferably in the range from 4 to 100, preferably 5 to 50, more preferably 6 to 30 and most preferably 6.5 to 15 ester groups.

The average number of alk(en)yl, preferably PIB, groups in the polyester corrosion inhibitor is suitably in the range from 2 to 30, preferably 2.5 to 20, more preferably 3 to 15 and most preferably 3.5 to 10.

The average number of succinic groups in the polyester corrosion inhibitor is suitably at least 2, preferably in the range from 2.5 to 30, more preferably 3 to 15 and most preferably 3.5 to 10.

The average number of reaction residues of alk(en)yl substituted succinic anhydride groups, preferably PIBSA, in the polyester corrosion inhibitor is suitably in the range from 2 to 30, preferably 2.5 to 20, more preferably 3 to 15 and most preferably 3.5 to 10.

The average number of reaction residues of polyol groups, preferably sorbitol, in the polyester corrosion inhibitor is suitably in the range from 1 to 30, preferably 1.5 to 20, more preferably 2 to 10, and most preferably 2.5 to 6.

A suitable polyester manufacturing method is known and described in published PCT patent publication number WO2016/053634, which is incorporated herein by reference. However, in manufacturing, for better control of the condensation polymerization, a diluent medium may be added to reduce the viscosity of the reaction mixture. The diluent is often added before the condensation polymerization reaction commences. The diluent may be paraffinic, for example mineral oil, or aromatic.

In accordance with the present invention there is provided a composition comprising a polyester corrosion inhibitor in accordance with the embodiments described above.

Suitably, the composition may also comprise a diluent. In this case, the concentration of the polyester corrosion inhibitor in the diluent medium is suitably in the range from 10 to 90%, preferably 20 to 80%, more preferably 30 to 70%, particularly 40 to 60%, and especially 45 to 55% by weight based on the total combined weight of the diluent and polyester corrosion inhibitor, which may provide the total composition, or the composition may also include additional additives as described below.

Optionally, the composition comprising a polyester corrosion inhibitor may comprise further additives. Examples of further additives include dispersants, anti-oxidants, anti-wear agents, emulsifiers, demulsifiers, detergents, viscosity index improvers, defoamers, pour point depressants, friction reducing additives and extreme pressure agents, and the selection of such further additives will depend upon the intended final use of the composition. In this way, the composition comprising a polyester corrosion inhibitor may be used as an "additive package" which can be easily added to a base oil or lubricant to render it suitable for its intended use.

As such, suitably, the composition comprising a polyester corrosion inhibitor as described above may be incorporated into a base oil or lubricant an effective amount to provide corrosion inhibition. As stated above, the effective amount may be between 0.01 wt % and 1.0 wt % polyester corrosion inhibitor based on the total weight of the base oil or lubricant. As such, there is also provided by the present invention a base oil or lubricant composition comprising between 0.01 wt % and 1.0 wt % polyester corrosion inhibitor based on the total weight of the base oil or lubricant. Preferably the base oil or lubricant composition comprises between 0.02 wt % and 0.7 wt % polyester corrosion inhibitor, more preferably between 0.03 wt % and 0.5 wt %, and most preferably between 0.05 wt % and 0.3 wt %, or even 0.05 wt % and 0.1 wt %. In some particularly preferred embodiments, the base oil or lubricant comprises a Group V environmentally acceptable base oil. It should be understood that the base oil or lubricant may comprise further additives, particularly those as described above which are optionally present in the composition comprising polyester corrosion inhibitor.

Use of a polyester obtainable by reacting an alk(en)yl substituted succinic anhydride wherein the average number of succinic groups per alk(en)yl group is less than 3.0, with at least one polyol, as a corrosion inhibitor is also contemplated. The preferred embodiments of the corrosion inhibitor for such a use are as described above in relation to the polyester corrosion inhibitor.

EXAMPLES

The present invention will now be further explained with reference to the enclosed examples provided below and the Figures in which:

FIG. 1—test data for corrosion inhibitors in a Group I base oil

FIG. 2—test data for corrosion inhibitors in a Group II base oil

FIG. 3—test data for corrosion inhibitors in a Group III base oil

FIG. 4—test data for corrosion inhibitors in a Group IV base oil

FIG. 5—test data for corrosion inhibitors in a Group V environmentally acceptable base oil FIG. 6—independent test house test data for corrosion inhibitors in a Group V environmentally acceptable base oil.

In the following Examples the standard test method ASTM D665B for corrosion inhibition of mineral oil in presence of synthetic seawater is used.

Example 1

Four base oils (one form each of Group I-IV) were selected for the testing as shown in Table 1, below.

TABLE 1

| Base Oil | Oil |
| --- | --- |
| Group I | ExxonMobil Americas Core 100 |
| Group II | ExxonMobil EHC45 |
| Group III | SK Lubricants YuBase 4 |
| Group IV | ExxonMobil PAO4 |

The corrosion inhibitors as detailed in Table 2 where the polyester is the reaction product of the alk(en)yl substituted succinic anhydride PIBSA with a varied carbon length polyol as indicated (C3, C5, or C6), were evaluated in each of the base oils detailed in Table 1, including a range of polyesters in accordance with the present invention and an imidazoline-based product used as an industry relevant reference.

TABLE 2

| Corrosion Inhibitor | Wt. % in Base Oil |
| --- | --- |
| Imidazoline-based product | 0.05 |
| Polyester with C3 polyol | 0.05 |
| Polyester with C5 polyol | 0.05 |
| Polyester with C6 polyol | 0.05 |

For each evaluation/test performed a mixture of 300 mL of base oil of interest with or without a corrosion inhibitor was stirred with 30 mL of synthetic seawater for 4 hours at 60° C. (in accordance with ASTM D665B). A cylindrical steel rod was fully submerged in the solution to be evaluated for the entire duration of the test and was then analysed for rust (corrosion) and degree of rusting.

After performance of the ASTM D665B procedure, the steel rods were rated for corrosion in comparison to the rod submerged in the base oil of interest with no corrosion inhibitor present. Results are ranked from 1 to 5, with 1 being the least corroded (best) and 5 being the most corroded (worst).

In the Group I base oil (Core 100), the imidazoline-based product exhibited the best corrosion inhibition, followed by the C5 polyol polyester corrosion inhibitor in accordance with the present invention. The results obtained are provided in FIG. 1.

In the Group II base oil (EHC45), the imidazoline-based product exhibited the best corrosion inhibition, followed by the C5 polyol polyester corrosion inhibitor in accordance with the present invention. The results obtained are provided in FIG. 2.

In the Group III base oil (YuBase 4), the imidazoline-based product exhibited the best corrosion inhibition, followed by the C6 polyol polyester corrosion inhibitor in accordance with the present invention. The results obtained are provided in FIG. 3.

In the Group IV base oil (PAO 4), the imidazoline-based product exhibited the best corrosion inhibition, followed by the C6 polyol polyester corrosion inhibitor in accordance with the present invention. The results obtained are provided in FIG. 4.

For all the tests within this example, the imidazoline-based corrosion inhibitor performed the best. However, this performance was closely followed by the polyester chemistries in accordance with the present invention (and particularly the polyol C5 and polyol C6 containing polyester corrosion inhibitors) which provided significant improvement in corrosion inhibition compared to the base oils that had no corrosion inhibitor added. The polyester corrosion inhibitors in accordance with the present invention provide an advantage over the commonly used imidazoline-based corrosion inhibitors, as they are less hazardous.

Example 2

The polyester corrosion inhibitors identified as C5 polyol and C6 polyol above were also evaluated/tested as corrosion inhibitors in a Group V environmentally acceptable base oil using the ASTM D665B procedure. In this case a blend of Priolube™ 1973 and Priolube™ 3987 (well-known industry accredited environmentally acceptable base oils) at a blend ratio of 1:1 was used as the base oil. The polyester corrosion inhibitors were added at a level of 0.05 wt. % and 0.10 wt.

% in the base oil and compared to an imidazoline-based industry-relevant reference provided at a level of 0.05 wt. % in the oil. Results are ranked from 1 to 5, with 1 being the least corroded (best) and 5 being the most corroded (worst).

In this Group 5 base oil, the polyester corrosion inhibitor comprising the C6 polyol exhibited the best corrosion inhibition at both 0.05 wt. % and 0.10 wt. % inclusion in the oil and provided a better performance than the imidazoline-based reference. The results obtained are provided in FIG. 5. As such, the polyester corrosion inhibitors of the present invention may be particularly suited to use in Group V environmentally acceptable base oils.

Example 3

In addition to the tests performed above, an independent test house (SGS) was employed to verify the effect using the same ASTM D665B test method with Priolube™ 1973 being used as the Group 5 environmentally acceptable base oil. The polyester corrosion inhibitor comprising C6 polyol was tested as a corrosion inhibitor in the selected base oil at a level of 0.1 wt. % inclusion. An oleyl sarcosine industry benchmark comparative example (Crodasinic™ O) was also tested at a level of 0.1 wt. % inclusion in the base oil.

The polyester corrosion inhibitor of the present invention performs equivalently to the oleyl sarcosine industry benchmark as a corrosion inhibitor such that no corrosion was evident on the steel rods at the end of the test. The polyester corrosion inhibitor of the present invention, however, is less hazardous and less toxic than oleyl sarcosine which brings an added advantage to its use.

The invention claimed is:

1. A method of inhibiting corrosion on a metal component comprising:
    adding to a base oil or lubricant an effective amount of a polyester corrosion inhibitor obtained by reacting at least one polyol with an alk(en)yl substituted succinic anhydride, wherein the average number of succinic groups per alk(en)yl group is less than 3.0, wherein the alk(en)yl group is a C6-C20 alkene, and wherein the polyester corrosion inhibitor composition further comprises an additive comprising a dispersant, anti-oxidant, antiwear agent, emulsifier, demulsifier, detergent, viscosity index improver, defoamer, pour point depressant, friction reducing additive, extreme pressure agent, or a combination thereof; and
    contacting the base oil or lubricant with the metal component.

2. The method according to claim 1 wherein the effective amount of the polyester corrosion inhibitor is between 0.01 wt % and 1.0 wt % based on the total weight of the base oil or lubricant.

3. The method according to claim 1 wherein the average number of succinic groups per alk(en)yl group is less than 2.5.

4. The method according to claim 3 wherein the average number of succinic groups per alk(en)yl group is less than 2.0.

5. The method according to claim 1 wherein the alk(en)yl group is octene, dodecene, or octadecene.

6. The method according to claim 1 wherein the alk(en)yl group is C8-C18 alkene.

7. The method according to claim 1 wherein the alk(en)yl group has an average molecular weight of 100 to 15,000.

8. The method according to claim 1 wherein the average number of succinic groups in the polyester corrosion inhibitor is 2.5 to 30.

9. The method according to claim 8 wherein the average number of succinic groups in the polyester corrosion inhibitor is 3 to 15.

10. The method according to claim 1 wherein the polyester has an average molecular weight Mn of 1,500 to 500,000 and/or an average molecular weight Mw of 3,000 to 1,000,000.

11. The method according to claim 1 wherein the polyester comprises the reaction residue of at least 2 alk(en)yl substituted succinic anhydride groups.

12. The method according to claim 1 wherein the polyester comprises the reaction residue of 2 to 30 polyol groups.

13. The method according to claim 1 wherein the polyol is sorbitol.

14. The method of claim 1, wherein the adding to the base oil or lubricant of an effective amount of the polyester corrosion inhibitor comprises adding to the base oil or lubricant a composition comprising the polyester corrosion inhibitor.

15. The method of claim 14, wherein the composition further comprises a diluent.

16. The method of claim 1, wherein the polyol comprises ethylene glycol, propylene glycol, glycerol, polyglycerol containing up to 6 glycerol units, a C4 polyol, a C5 polyol, a C6 polyol, a C12 polyol, or a combination thereof.

17. The method of claim 1, wherein the polyol comprises threitol erythritol, inositol, arabitol, ribitol, xylitol, glycerol, polyglycerol, pentaerythritol, galactitol, fucitol, iditol, trimethylolpropane, mannitol, sorbitol, sorbitan, sucrose, or a combination thereof.

18. The method of claim 1, wherein the corrosion inhibited on the metal component comprises rust.

\* \* \* \* \*